(12) United States Patent
Brodmann et al.

(10) Patent No.: US 11,183,705 B2
(45) Date of Patent: Nov. 23, 2021

(54) ENERGY-CONVERTING FUEL CELL OR ELECTROLYZER

(71) Applicant: WESTFAELISCHE HOCHSCHULE GELSENKIRCHEN BOCHOLT RECKLINGHAUSEN, Gelsenkirchen (DE)

(72) Inventors: Michael Brodmann, Huenxe (DE); Cristian Mutascu, Gelsenkirchen (DE); Pit Podleschny, Dortmund (DE); Ulrich Rost, Dortmund (DE); Jeffrey Roth, Krefeld (DE); Christoph Sagewka, Dorsten (DE); Florian Wirkert, Witten (DE)

(73) Assignee: WESTFAELISCHE HOCHSCHULE GELSENKIRCHEN BOCHOLT RECKLINGHAUSEN, Gelsenkirchen (DE)

( * ) Notice: Subject to any disclaimer, the term of this patent is extended or adjusted under 35 U.S.C. 154(b) by 350 days.

(21) Appl. No.: 16/307,515

(22) PCT Filed: Jun. 8, 2017

(86) PCT No.: PCT/EP2017/000667
§ 371 (c)(1),
(2) Date: Dec. 20, 2018

(87) PCT Pub. No.: WO2018/001543
PCT Pub. Date: Jan. 4, 2018

(65) Prior Publication Data
US 2019/0326622 A1    Oct. 24, 2019

(30) Foreign Application Priority Data

Jun. 27, 2016  (DE) ..................... 10 2016 007 739.5

(51) Int. Cl.
*H01M 8/2484* (2016.01)
*C25B 15/08* (2006.01)
(Continued)

(52) U.S. Cl.
CPC .......... *H01M 8/2484* (2016.02); *C25B 15/08* (2013.01); *H01M 8/006* (2013.01); *H01M 8/248* (2013.01)

(58) Field of Classification Search
CPC .... C25B 9/73; C25B 9/75; C25B 9/77; C25B 15/08; H01M 8/248; H01M 8/2484
See application file for complete search history.

(56) References Cited

U.S. PATENT DOCUMENTS

| 5,116,696 A | 5/1992 | Barp |
| 5,418,079 A | 5/1995 | Diethelm |

(Continued)

FOREIGN PATENT DOCUMENTS

WO    2008050781 A    5/2008

*Primary Examiner* — Ciel P Contreras
(74) *Attorney, Agent, or Firm* — Andrew Wilford

(57) ABSTRACT

The invention relates to a device (1) for Converting chemical energy into electrical energy, or electrical energy into chemical energy, having at least one electrochemically active, planar cell (2) that is held securely between coaxial annular disks (10a, 10b, 10c, 10d) of an electrically insulating support frame (10), through which a supply structure with Channels (22, 23, 13, 33) for process media extends to the cell (2). A free spatial region (8a, 8b) is present on either side of the cell (2) in the axial direction, which region is bounded in the radial direction by at least one of the annular disks (10a, 10b). The spatial regions (8a, 8b) are open toward a pressure Chamber (5) via at least one passage (42a, 42b) through the corresponding annular disk (10a, 10b). When the device (1) is in Operation, the pressure Chamber (5) is filled with a pressurized medium, as a consequence of which the cells are compressed. In this manner, the device (Continued)

(1) according to the invention combines the advantages of a conventional Stack of cells (2, 2') with a hydraulic or pneumatic compression.

20 Claims, 6 Drawing Sheets

(51) Int. Cl.
*H01M 8/00* (2016.01)
*H01M 8/248* (2016.01)

(56) References Cited

U.S. PATENT DOCUMENTS

| | | | |
|---|---|---|---|
| 5,783,051 A * | 7/1998 | Hirai | C25B 1/04 |
| | | | 204/254 |
| 8,349,151 B2 | 1/2013 | Schmitt et al. | |
| 2003/0054210 A1* | 3/2003 | Gillett | H01M 8/04228 |
| | | | 429/429 |
| 2009/0255862 A1* | 10/2009 | Harrison | C02F 3/046 |
| | | | 210/167.31 |
| 2011/0210012 A1* | 9/2011 | Sioli | C25B 9/75 |
| | | | 205/742 |
| 2012/0031772 A1* | 2/2012 | Dean | C25B 9/73 |
| | | | 205/637 |
| 2013/0015059 A1* | 1/2013 | Haryu | C25B 9/23 |
| | | | 204/257 |
| 2015/0299875 A1* | 10/2015 | Lopez De Echazarreta Elvira | C25B 9/19 |
| | | | 204/263 |
| 2016/0153560 A1* | 6/2016 | Doucet | C25B 9/00 |
| | | | 204/267 |

* cited by examiner

ENERGY-CONVERTING FUEL CELL OR ELECTROLYZER

CROSS REFERENCE TO RELATED APPLICATIONS

This application is the US-national stage of PCT application PCT/EP2017/000667 filed 8 Jun. 2017 and claiming the priority of German patent application 102016007739.5 itself filed 27 Jun. 2016.

FIELD OF THE INVENTION

The invention relates to a convertor for transforming chemical energy into electrical energy or electrical energy into chemical energy, comprising at least one electrochemically active, planar cell that is held between coaxial rings of an electrically insulating support frame through which extends a supply structure with channels for process media to the cell.

BACKGROUND OF THE INVENTION

Converters of this type are generally known. They are used as a fuel cell, electrolyzer, or battery. As a rule, these converters comprise a plurality of electrochemical, planar cells that lie on top of one another or next to one another in the form of a stack. In hydrogen systems, this is also referred to as a fuel cell stack or electrolyzer stack. The standard structure of such a converter is described, for example, in "F. Barbir, PEM Fuel Cells Theory and Practice, Second Ed., Academic Press, Waltham, 2013."

According to this standard construction, a plurality of cells are mechanically compressed in order to reduce the electrical contact resistance within the cell, thereby minimizing losses in the cell (overpotentials). Conventionally, this is done in such a way that two pressure plates between which a cell stack is located are clamped against one another by clamping elements. The individual electrochemical cells are thus initially stacked directly on one another and then pressed together by the clamping elements, for example tie rods, in order to impart the required contact pressures to the individual elements.

For a high-pressure water electrolyzer, U.S. Pat. No. 8,349,151 B2 describes a cell frame with coaxial rings between which an electrochemically active, planar cell is securely held. Here as well, a supply structure with channels for process media extends through the cell frame or the rings to the cell. The pressing of the cell is also performed here mechanically by screws that extend axially parallel through end plates and the rings arranged therebetween and, when tightened, press the end plates and rings against one another and press the end plates flat against the electrodes.

Mechanical compression is not free of drawbacks, however, since it results in stringent requirements in terms of material characteristics and the dimensional accuracy of the individual elements. In general, this leads to considerable problems, especially for higher power classes of >1 kW, since a uniform compression of all of the elements in the stack can only be guaranteed to a limited extent. Differences in compression thus occur over the active area, which inevitably causes an increase in overpotentials and results in associated uneven current distributions within the cell. These can lead to the development of local hot spots that bring about local overloads, especially within the electrochemically active part of the cell, for example within the catalyst-coated membrane (CCM, Catalyst Coated Membrane), and cause damage, particularly thermal damage, to the stack or individual cells. This is a primary reason for the failure of such a cell stack that is being operated at high current densities, because only a single one of the stacked cells need have a defect caused by local overloading.

Another problem with conventional stack constructions is the complex topology required for the thermal conditioning of the system. Due to the high currents in conjunction with the low voltages, non-negligible amounts of lost heat are produced that must be conducted out of the stack in order to ensure a constant temperature level at the operating point and not thermally overload the components of the electrochemical cell, particularly of the membrane or separator. In conventional stacks, the cooling is generally performed by cooling cells that are between two of the electrochemical cells and can or must dissipate excess heat, for example via water circulation. Besides the additional material required for the cooling cell, this results in higher weight and manufacturing costs as well as additional electrical losses, since the cooling cells, as electrochemically passive elements, are located between the electrochemically active (galvanic) cells and must be bridged for the series connection, lest they cause additional losses when the electrical energy is fed through.

As an alternative to the mechanical pressing of the cells, international patent application WO 2011/069625 [U.S. Pat. No. 9,178,245] describes hydraulic compression. For this purpose, the individual cells are respectively present as single cells with monopolar pole plates in a pocket that is completely surrounded on the outside by a hydraulic medium. By raising the pressure on the hydraulic medium during operation of the converter, the cells are thus pressed flat, since the same contact pressure is applied to each cell. For one, this compression is homogeneous over the active cell area of the individual cells, so that there is no locally elevated current density within the cells and hence no local hot spots. For another, the compression is homogeneous along the stack, since all of the cells are equally exposed to the pressure that prevents the occurrence of different current densities from cell to cell. The same applies to the temperature distribution. Hydraulic compression provides the advantage that any number of cells can be implemented with any active cell surface. However, the drawback here is that the electrical interconnection of the individual cells for the purpose of forwarding the current from one cell to the next must occur in the outer region of the cells and not, as in conventional cell stacks, over the entire cell surface. This leads to additional electrical losses along the external electrical connection between the cells as well as due to the contact resistance at the transfer points between the cells. Moreover, only quadrangular cell constructions are expedient due to the external interconnection of the individual cells, which limits the use of the cell stacks.

OBJECT OF THE INVENTION

It is the object of the present invention to provide a novel construction for a convertor for transforming chemical energy into electrical energy or electrical energy into chemical energy that combines the advantages of the conventional construction in stacked cells having mechanical compression with the advantages of the hydraulic compression of the cells. In particular, a converter having a simple and compact construction that enables cost-effective series production is to be provided in which a homogeneous compression of the cell on the one hand or, in the case of a plurality of cells, a homogeneous compression of all cells on the other hand is present in order to achieve a high level of efficiency. In addition, the above-mentioned topological disadvantages are eliminated, so that almost any planar geometry is made possible.

SUMMARY OF THE INVENTION

According to the invention, a convertor for transforming chemical energy into electrical energy or electrical energy into chemical energy is proposed that comprises at least one electrochemically active, planar cell that is held between coaxial rings of an electrically insulating support frame through which extends a supply structure with channels for process media to the cell, two free compartments being formed that axially flank the cell and that are delimited by the rings radially, and the compartments are each open into a pressurizable chamber via at least one passage through the respective ring, the pressurizable chamber being filled with a pressurized medium during operation of the converter.

The converter according to the invention thus makes use of the advantages of the hydraulic compression of electrochemical cells, particularly the homogeneous surface compression of the cell, and combines these with the advantages of a support frame having a layered construction that is mechanically clamped axially in the designated manner in order to secure the cell firmly between the rings. The support structure is especially suitable for stacking the rings complete with cells, thereby achieving a particularly compact design of the converter.

In principle, the converter can have any outer cross-sectional shape. It can be rectangular, particularly square, triangular, or round, particularly oval-shaped or circular. Accordingly, the support frame then also has such a cross section. That having been said, it is advantageous if the cross section of the support frame, and preferably of the housing as well, is round, particularly circular, since space optimization is achieved in this way in cylindrical housings, hereinafter also called pressurizable containers, such as those used in high-power electrolyzer stacks. On the other hand, rectangular shapes are conducive from an economic perspective, since they enable optimal utilization of the membrane material due to the fact that the membrane material is rolled stock (for example 30 cm width×length). It should be noted at this point that the terms "support frame" and "ring" do not refer to a particular cross-sectional shape.

The converter can be a fuel cell, an electrolyzer, or a battery. The structure being proposed here is thus not limited to a specific use, but rather can be applied to various applications. Depending on the application, all that needs to be selected are the appropriate process media and/or the introduction thereof into the cell or discharge thereof from the cell. The construction according to the invention is outstandingly suitable for stacking cells, enabling for example fuel cell stacks, electrolyzer cell stacks, or battery stacks to be produced. According to one embodiment, the converter comprises a plurality, particularly a multiplicity of electrochemically active, planar cells each held securely between coaxial rings of the support frame. All of the rings are then stacked concentrically on one another.

In one embodiment, the at least one cell can form a single cell on the plane. However, it is also possible and preferred according to another embodiment for the at least one cell to form a cell segment of a cell module of two or more cell segments or cells, in which case each cell segment is an independent cell, electrochemically speaking, and all cell segments lie on the same plane.

The converter can then have one, two, or more, particularly a multiplicity, of such cell modules, each with a number of cell segments. If a round basic shape of the support frame is used, the cell segments viewed in cross section can have the shape of a slice of pie. In the case of a rectangular basic shape, the cell segments can also be rectangular or square when viewed in cross section.

The rings are essentially annular plates. In a embodiment of the converter with individual cells, they can each have a central opening, so that the support frame virtually forms a hollow cylinder. The at least one cell can take up the entire surface of the opening here.

In a embodiment with at least one cell module, the cell module can take up the entire area of the opening. The cell module can be divided symmetrically into the cell segments. Here, the rings are preferably not only embodied as rings but expediently also have radially extending webs or ribs or, in the case of two cell segments, at least one web/rib extending along the boundary between one cell segment and the other cell segment. Thus, in a cell module having three or more cells/cell segments, the rings, when viewed in cross section, can be embodied in the form of a wagon wheel whose spokes form the webs, with the cell segments or the cells lying in axial projection between the webs. The webs provide mechanical stabilization of the areas between the cells. The number of rings depends on the number of cells or cell modules to be supported by the support frame, with each cell or cell module being associated with a plurality of rings. In the case of only one cell or only one cell module, the support frame can have at least two rings between which the cell/cell module is held. The thickness of the cell (as a single cell or in the cell module) can be compensated for by for example a sealing disk between the two rings.

Typically, the support frame can comprise at least three rings or, more particularly, three rings per cell/cell module, in which case the respective cells cell can be held between two outer rings that each abut axially against one of the cells that form the cell walls. The third ring then lies between the outer rings and keeps them apart. The axial thickness of the third ring, also referred to hereinafter as the intermediate ring, can conform to the axial thickness of the respective cell.

Since the supply structure is built into the rings, it makes sense for the support frame to be made of four rings or for it to be constructed such that four rings are respectively associated with a cell or a cell module. This simplifies the manufacturing process, as will be demonstrated below. Two intermediate rings can then be present between the outer rings, meaning that the third ring is divided once again axially.

However, it is possible for the outer rings and/or the intermediate rings to be divided again as well, so that the support frame can also have more than four rings for a cell/cell module.

Three, four, or more rings are thus associated with the cell/cell module, depending on the embodiment. If the converter has two or more cells or two or more cell modules, each of these cells or cell modules can be associated with three, four, or more rings. However, this does not necessarily mean that there must be three, four, or more rings per cell/cell module. As will be explained below, a ring can also be associated with two cells or cell modules that are adjacent one another. The entire support frame then has correspondingly fewer rings. In the case of two cells and four rings per cell, for example, it has a total of seven rings. In the case of three cells and four rings per cell, there can be a total of ten rings, etc.

Depending on the thickness of the rings, the cell/cell module is preferably axially in the center of the cylinder, particularly of the hollow cylinder, that is formed by the rings that are associated with a cell, so that the cell or cells of the cell module lies or lie transverse to the axis of the support structure and thus fills out or fill out the opening. Each of the free compartments then is at an axial end face of the respective cell(s). They are thus delimited in an axial direction by the corresponding cell and in at least one radial direction by the inner surface or at least a portion of the inner surface of the outer rings that lie surround this cell. In the other axial direction, the respective compartment can be delimited by an adjacent cell or an axial end plate. In an alternative embodiment, however, the compartment can also be open in an axial direction. This variant will be explained later.

Due to the passage in the ring that radially delimits a compartment, i.e. the outer ring, the same pressure is present within the compartment as radially outside this ring or outside the support frame. In order to make this pressure adjustable, the support frame together with cell or cells or cell modules can be accommodated within a pressure-tight housing whose interior is filled with a medium that is pressurized during operation of the converter. The pressurizable chamber is then formed by the interior of this housing and thus constitutes a part of the converter. Alternately, the pressurizable chamber can also be outside the converter, in which case corresponding lines can connect the compartments with the external pressurizable chamber.

When the converter is idle, however, the pressure can be released. The medium can be a gas or a liquid such as water, for example. The pressure is then passed via the medium through the passage opening into the compartments and, from there, to the cells. Thus, the cell or cells has or have direct contact with the medium with its or their outer wall. Special pockets for receiving cells can thus be dispensed with, which simplifies the construction substantially. The pressure acts from both axial directions and thus compresses the cell(s) flatly together in a homogeneous manner. In the case of a gas, there is pneumatic compression and in the case of a liquid, there is hydraulic compression.

The loading of the medium with the pressure can be preferably done with a pressure controller that maintains the pressure within the pressurizable chamber constant, for example. Of particular advantage, however, is automatic pressure tracking as a function of the pressure within the or at least one of the cells, so that there is always a substantially constant pressure difference between the pressure inside the cell and the pressure inside the housing. This pressure difference can be between 4 bar and 10 bar, for example, particularly about 5 bar. In principle, any operating pressures can be achieved in the cells.

The supply structure can preferably comprise primary channels that extend axially to the cell through the rings. These can perform the central supplying or emptying of the cells or of all cells. They conduct the process media axially from an inlet of the converter to the cell or to all cells or from same to an outlet of the converter. The primary channels can be formed by axially parallel holes that are provided in the rings, for example. All rings are then arranged in terms of their mutual angular position such that the holes are aligned.

The primary channels comprise at least three individual channels in order to be able to perform the supplying and emptying of the cell or cells while keeping the media separated. For instance, in the case of a fuel cell, one passage can be provided to supply the hydrogen and oxygen fuel and another passage can be provided to discharge the resulting reaction water that emerges as an oxygen/water mixture. Such a variant is also called "dead-end," because the hydrogen is completely consumed and thus does not flow through the converter. For reasons of symmetry, the supply structure can comprise four primary channels. Independently of the number of individual channels, these can be angularly equidistant spaced in the support frame along a coaxial circumferential line. In the case of a fuel cell, two channels can then be used to introduce and discharge the oxygen, and two channels can be used to introduce and discharge the hydrogen.

Suitably, the supply structure can further comprise secondary channels that extend radially of the axis through the support frame into the cell. The secondary channels thus take over the supplying of the process media to a single cell/a single cell module or discharging thereof from same. The secondary channels thus connect the cell/cells with the primary channels. The secondary channels therefore need not extend over the entire radial width of the rings, but only need to bridge the distance between a primary passage and the cell edge. Consequently, the secondary channels extend approximately from a circumferentially circular line is centered on the axis and on which the axial primary channels lie, approximately from the center of the radial width, for example, to the inner periphery of the rings, to which the edge of the cell is then adjacent. Therefore, while the primary channels run axially to the cell/cells through the support frame, the secondary channels run radially to the cell/cell module. As a result, the supply structure takes up little space. Furthermore, passages outside of the support frame can be dispensed with, making the converter especially compact.

The secondary channels extend laterally relative to the cell. They can extend radially, i.e. along a diameter or parallel thereto. In an alternative embodiment, they can extend through the rings, so that the corresponding ring delimits a secondary passage located therein on all sides. Alternatively, the secondary channels can be formed in the surface of at least one of the rings as a groove. Since the rings are stacked on one another, the opposing ring seals the groove, so that such a groove forms a closed passage that is then delimited by two directly adjacent rings. Alternatively, the passage can be formed by two confronting grooves that are formed in adjacent rings and are in alignment with one another.

In principle, the cross section of the groove, more particularly of the secondary channels, can assume any shape, including rectangular, circular, oval-shaped, or even triangular. Furthermore, the cross section can change over the length of the passage both in terms of its shape and in its dimensions, for example becoming larger radially outwardly.

The overall cross section of the secondary channels can be smaller than the cross section of the primary channels, since the secondary channels are only responsible for the supply to or removal from a single cell, whereas the primary channels can supply to or remove from all cells simultaneously.

According to an advantageous embodiment, the secondary channels, when viewed on a radial plane, can be formed by two opposing passage structures having a plurality of individual channels, with the cell being situated between these two passage structures. As a result, a flow field is defined in the cell through which one of the process media passes in the direction of flow from one passage structure to another passage structure. The individual channels can extend from a primary passage to the cell like a comb or fan.

This has the advantage that the process medium can flow into or out of the cell at a plurality of points in the cell edge region, so that the active cell region inside the cell is supplied with the process medium over as large a surface as possible, particularly in a complete and uniform manner.

Preferably, the supply structure comprises two groups of secondary channels that are present on different radial planes of the support frame. This imparts great flexibility to the flow into and through the cell. Each of the two groups is then formed from two diametrically opposed passage structures having a plurality of individual channels extending like a comb or fan from a primary passage to the cell, with the cell being situated between the opposing passage structures. The second group also defines a flow field in the cell between a passage structure in the cell through which one of the process media passes in the direction of flow from one passage structure to another passage structure.

Advantageously, the two groups of secondary channels are offset at an angle to one another, preferably rotated by 90° relative to one another, so that the flow fields intersect, particularly crossing at a right angle. This ensures that the rings can have a symmetrical design. The primary channels are also spaced apart by the greatest possible distance as a result.

The secondary channels can be present in the intermediate ring(s), because they face with their inner surface toward the outer surface of the active region in the interior of the cell. This ensures that the direction of flow is directed through the secondary channels directly into the cell interior or leads out of same. The secondary channels can be embodied in the form of holes or in the form of surface structures. The latter are easier to produce in terms of the mechanical manufacture of the rings and enable freer shaping and thus freer media routing.

Insofar as the support frame comprises only one intermediate ring per cell, the first group of secondary channels can be arranged or introduced on its one axial end and the second group of secondary channels on the rear axial end, for example. However, this has the disadvantage that the intermediate disk must be turned over after the production of the first group in order to form the second group of secondary channels on the back side. It is therefore advantageous if the support frame has four rings or two intermediate rings. Here, the first and second group of secondary channels can each be arranged or introduced on an axial end face of the intermediate rings. The two intermediate rings can then be arranged such that they are back to back, meaning that the passage structures are disposed on end faces that face away from one another.

In order to convey different process media to the two groups of secondary channels, they are connected to different primary channels. In a embodiment with three primary channels, the first group of secondary channels can be associated with two primary channels, in which case each of these two primary channels is connected to one of the two passage structures of the first group of secondary channels. In the case of a fuel cell, for example, the supply of the cell with oxygen then be via one of these primary channels including the passage structure associated therewith, in which case the oxygen then flows out through the other passage structure on the opposite side of the cell and conducted out of the support frame via the second of the two primary channels. The third of these primary channels, including the passage structure of the other group associated therewith, can be used to supply the cell with hydrogen. Since the hydrogen may be almost completely consumed (dead-end operation), it does not need to be discharge separately from the cell, particularly not conducted out of the cell on the side opposite from where the hydrogen is introduced into the cell. Furthermore, the process water resulting from the reaction of oxygen and hydrogen, together with the excess oxygen, can be conducted out through the second passage structure of the first group and through the second of the two primary channels.

For reasons of symmetry, a fourth primary passage can also be present in another embodiment that is connected to the second passage structure of the second group of secondary channels and also serves to conduct the resulting mixture of process water and oxygen out of the cell and the support frame, preferably on the side of the cell diametrically opposite where the hydrogen is introduced.

The following explanations concern both the cell as a single cell and the cell as a cell segment of a cell module in equal measure. Therefore, where there is mention of a cell below, both variants are meant. In that regard, no distinction is made between cell and cell module, at least insofar as a differentiation does not appear to be expedient.

According to one embodiment, the cell can be held with its outer edge region on an inner edge region of the rings between same. The cell is thus mechanically pressed at its peripheral edge, around the entire circumference in the case of a single cell. The cell interior is thus also sealed toward the outside. The cell is thus situated completely within the support frame.

Due to the surface pressure acting on the cell in the compartments, the outer edge region of the cell must be flexible, in particular movably held on the rings. Otherwise, a rupture may occur at the transition of the cell to the ring due to the pressure exerted on the cell wall. For this reason, it is advantageous if the cell does not contact the rings directly, but rather if an elastic element, for example a molded seal, optionally a seal ring, is provided between the outer edge region of the two axial end faces of the cell and the inner edge region of the opposing end face of the corresponding ring, or such a molded seal is arranged on each axial side. The outer periphery of the cell is then held flexibly, so that the outer walls of the cell can move slightly under application of axial pressure. At the same time, the seal rings also reliably prevent the pressurized medium from entering the cell. The seals can be annular flat gaskets or another molded seal, for example.

In the case of a cell module, triangular flat gaskets can be used that correspond to the pie shape of the cell segments. Optionally, a molded seal having the shape of a carriage wheel can also be used that covers all cell segments simultaneously.

The outer walls of the cell can be formed, for example, by an electrically conductive plate or film, for example of graphite or metal, particularly a copper plate or copper film. Optionally, the outer walls can have an anticorrosive layer on the inside in order to protect the metal, particularly the copper, against corrosion as a result of operation at high cell potentials, particularly in electrolyzer mode.

The rings can each have an annular recess on one or both axial end faces at the inner edge in order to grip the edge of the cell. The outer edge region of the cell can fit positively within the recess. The above-mentioned seal ring, particularly the flat gasket, whose shape can be adapted to the shape of the recess, is preferably also seated here.

One embodiment in which a ring has an annular recess on both axial end faces on the inner edge region has the effect that the end faces are symmetrical at least in the radially inner region. This offers the advantage, for one, that it is not necessary to pay attention to the orientation of the ring during assembly. It therefore does not matter which end face is on top and which is on the bottom. This facilitates assembly.

Preferably, the rings that delimit the compartments radially toward the outside are symmetrical relative to a central radial plane. The recesses on both sides then enable each of the recesses to receive the edge of a separate cell. Two cells can thus rest on this one ring, sharing it, as it were. The free region at one side one cell is therefore also at the side of the other cell. When a plurality of cells are stacked, this shortens the axial length of the stack, achieving an even more compact design.

According to an advantageous embodiment, two or more, particularly four or eight passages to the pressurizable chamber, particularly to the interior of the housing, can be present in the rings that radially delimit the compartments. This has the effect that the compartments can be traversed by the medium within the pressurizable chamber. This offers the advantage that the medium can be used simultaneously for pneumatic or hydraulic pressing and for temperature-controlling the cell. A liquid such as water, for example, is more suitable here as a medium than a gas because of its greater heat capacity. An oil is more preferred than a liquid because it can be heated to higher temperatures than water, thus enabling the operation of a high-temperature electrolyzer.

The temperature control can be cooling in particular. The heat generated in the cell can thus be effectively removed from the cell. Intermediate cooling cells within a stack of several cells can thus be dispensed with. This, too, contributes to a reduction in the external dimensions of the converter. What is more, it can be expedient for the startup process of the converter to introduce heat into the converter, i.e. to supply the cells with thermal energy, in other words, to heat them. Again, this can be easily achieved by the hydraulic medium. It thus serves as a heat carrier.

Preferably, the interior of the housing is part of a flow loop for the medium, so that heat can be discharged not only from the cell or cells but also from the housing or the entire converter. As a result, not only the cooling of the converter is achieved. Rather, this also creates the opportunity to use the waste heat for another process (waste-heat recovery).

In order to achieve the best possible flow through the compartments, the cross section of the passages can be as large as possible. It will readily be understood that the secondary channels must not be located where the primary channels are situated, since they could otherwise be intersected by the secondary channels and process media could get into the interior of the housing. Furthermore, the hydraulic or pneumatic compression of the cell or cells would then no longer be possible. Those portions of the outer rings through which the primary channels extend thus constitute a limit to the extension of the channels in the circumferential direction. The passages can certainly be present in the rest of the region and have the cross section of ring segments. This offers the advantage that the outer rings are not made of solid material. Rather, the material forming the rings is removed to the greatest possible extent and now present only where process media are conducted, i.e. in order to embed the primary channels. As a result, substantial weight is saved in the outer rings, so that the total weight of the converter can be reduced accordingly.

In order to mechanically clamp the support frame, appropriate means for this purpose, such as tie rods, for example, can likewise extend axially through the support frame. For reasons of stability, those regions through which the clamping means extend axially should then also be spaced apart from the passages. The outer rings then form a kind of skeleton or spoke structure of two rings that are interconnected in the vicinity of the primary channels and the clamping means by support ribs.

As already mentioned, the support frame can be pressed axially together mechanically by clamping means in order to seal the cell(s) or cell module(s) and the supply structure. Seal rings between the rings or between the ring and the cell are thereby pressed together, thus separating the interior of the cell in a pressure-tight manner from the interior of the housing.

In the construction according to the invention, the clamping means therefore do not affect the pressing-together of the cells. The clamping means can be instantiated by tie rods that extend axially parallel through the rings, for example. A tie rod can consist of a machine screw with nut, for example.

According to a preferred embodiment, the electrical contacting of the cell can occur axially by electrically conductive springs. The axial contacting, especially when stacking a plurality of cells one above the other, has great advantages, since the electrical connections of the individual cells no longer need to be conducted out of the support frame or through it and connected there, for example in order to achieve a series connection of the cells. Instead, the electrical contacting takes place within the compartments.

The springs also prevent the electrical connection from being damaged or at least impaired as a result of the axial movement of the cell or cells during pneumatic or hydraulic compression. The springs thus ensure an outstanding electrical contact even during pneumatic or hydraulic compression. The use of springs also simplifies the assembly of the cell stack, since it is not necessary to electrically connect two adjacent cells to one another, for example by soldering a cable, prior to the stacking of the cells. After all, a spring allows stacking of a second cell on the first cell, thereby pressing the spring together and establishing a good electrical contact on both sides, i.e., both of the first cell on one side and of the second cell at the other end.

In order to further simplify assembly, the spring can be fixed relative to the first cell so that it does not slip during handling of the first row and during the mounting of the second cell. This can be achieved by securely connecting the spring to the first cell, for example by soldering. The adjacent cell is then contacted by attachment to the corresponding electrode, i.e. by a releasable contact. This not only facilitates assembly but also ensures easy disassembly of the individual cells.

However, the use of springs not only provides advantages in a converter in which two or more cells are stacked. Even in the case of a single cell, the electrical contacting of this cell by springs is advantageous because the converter can be easily assembled and connected to electrical contacts on or in the support frame at the same time. Thus, each of the springs can electrically contact an adjacent cell or an electrical terminal at an axial end of the support frame.

The springs can be bow springs, for example. Surface contact is thus achieved, enabling contact resistance to be minimized. The bow springs can be U-shaped for example and have two free legs that are interconnected by a common base, with each of the two legs bearing against a cell or an electrical contact in the support frame. Any other bow spring is conceivable, however, including those having an S- or Z-shaped cross section. According to an alternative embodiment, the springs can also be coil springs.

In principle, the cell or cells in the converter according to the invention can have a construction that is inherently known, particularly consisting of two electrodes and an ion-conducting membrane between them, with the electrodes each being composed of a catalyst layer that on one side of the membrane, a porous, electrically conductive power distributor, and a metallic plate or metal film for the electrical contacting, with the plates or the metal film sealing the interior of the row against the container pressure. The electrodes contact the ion-conducting membrane with their catalyst layer. The metallic plate or metal film can be made of copper, optionally with an anticorrosive layer.

Furthermore, the metallic plate can be optionally provided with a passage structure, a so-called flow field.

BRIEF DESCRIPTION OF THE DRAWING

Additional features, advantages, and characteristics of the converter according to the invention will be explained in further detail below on the basis of embodiments and the enclosed figures. In the drawing.

SPECIFIC DESCRIPTION OF THE INVENTION

Figure 4:
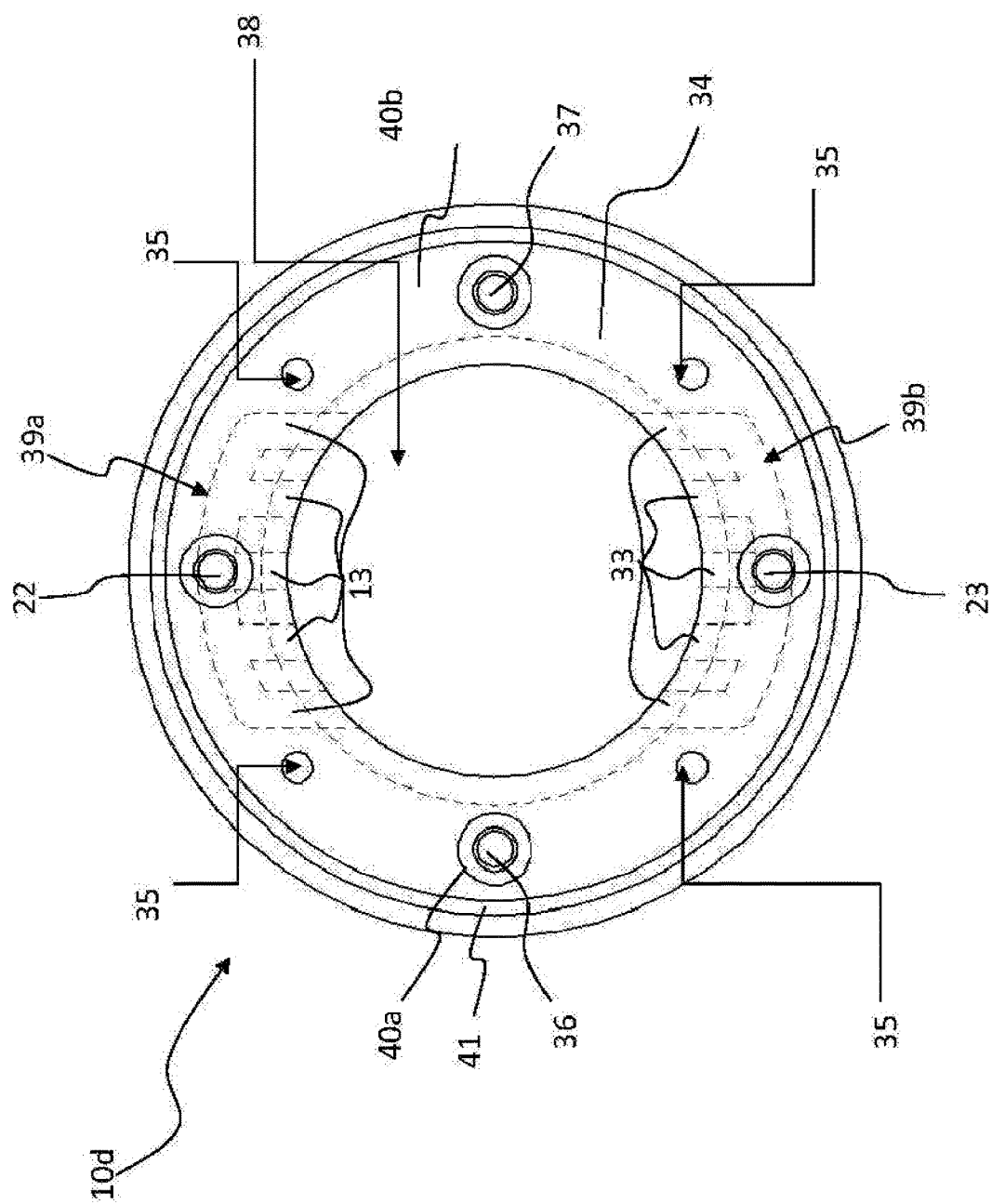
FIG. 4 is a top view of lower intermediate ring.
Figure 5:
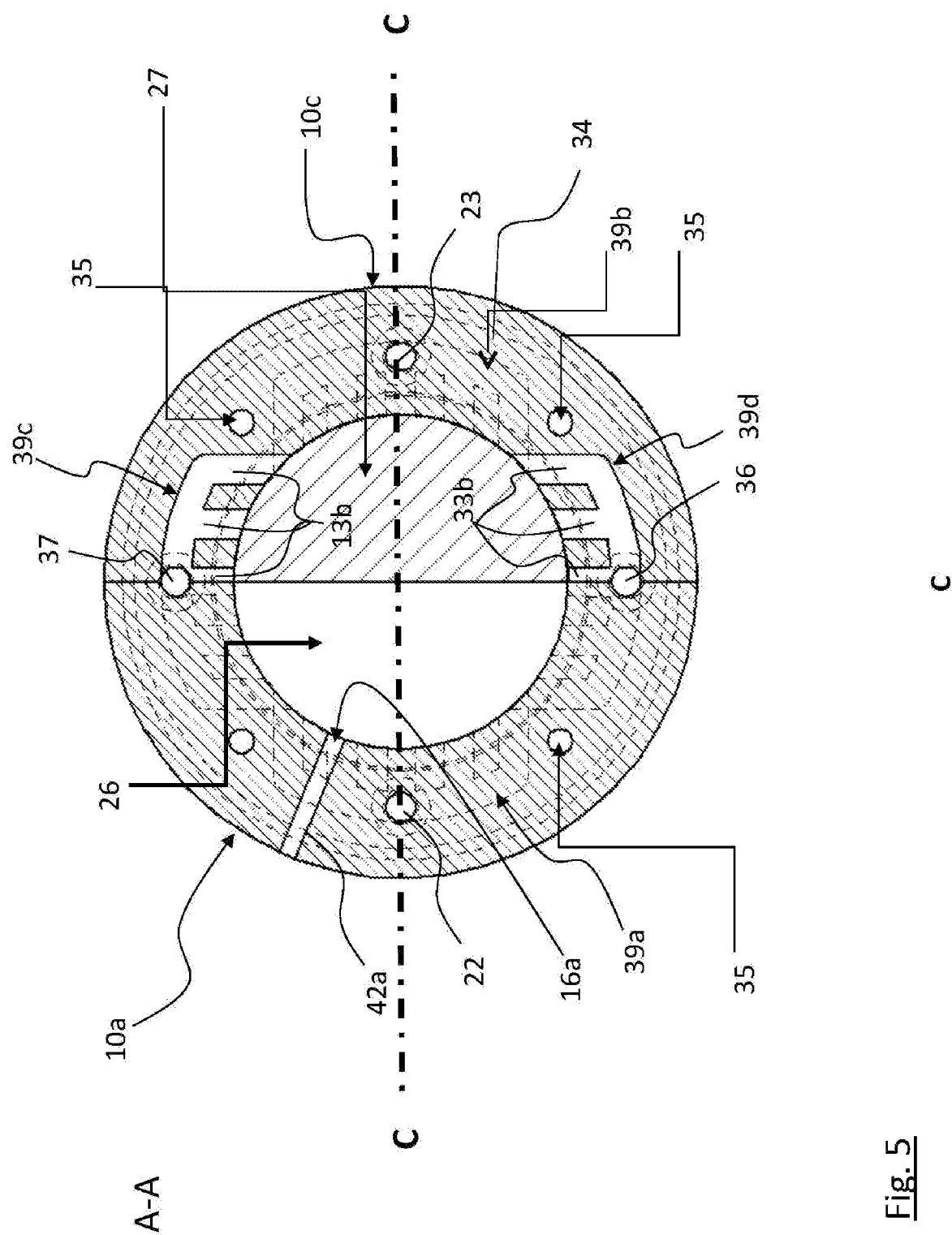
FIG. 5 is a section taken along section line A-A in FIG. 2.
Figure 6:
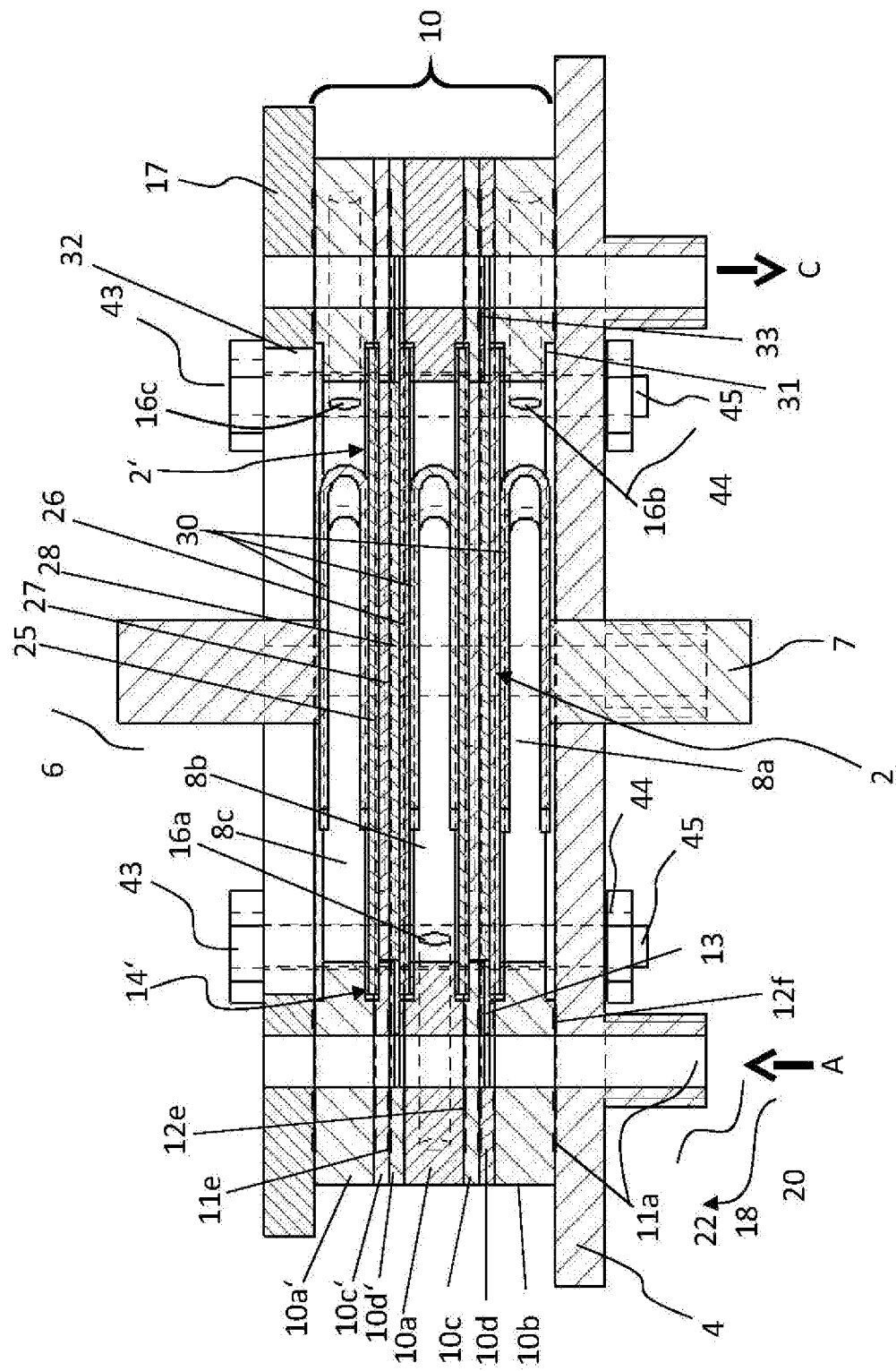
FIG. 6 is an axial cross section through a converter according to the invention with two cells.

FIGS. 1 to 5 show a first embodiment of a converter 1 according to the invention for converting chemical energy into electrical energy or electrical energy into chemical energy; and FIG. 6 shows a second embodiment to which, relative to the first embodiment, a second cell 2 has been added. In the figures, like reference symbols denote identical components unless otherwise described below.

To illustrate the basic idea of the invention, this converter 1 as in FIGS. 1 to 5 comprises only a single electrochemically active, planar cell 2 that is inside a pressurizable container 3, 4. Here, the pressurizable container 3, 4 consists of a housing 3 and a plate 4 that together define a closed pressurizable chamber 5, hereinafter referred to as the interior 5 of the pressurizable container 3, 4. An adjustable pressure p1 is present in the pressurizable chamber 5.

The cell 2 is securely held in an electrically insulating support frame 10 that is mounted on the plate 4. The plate 4 thus forms a base plate for the support frame 10 and thus for the electrochemically active portion of the converter 1. The support frame 10 consists here of four coaxially stacked rings 10a and 10b, 10c, 10d that form a hollow cylinder. The rings 10a, 10b, 10c, 10d have both a cylindrical outer surface and a cylindrical inner surface that defines an opening 38, and the cell 2 has a substantially circular shape and rests in the opening 38.

The cell 2 is held between the rings 10a, 10b, 10c, 10d and is approximately axially centered in the hollow cylinder. As a result, it separates the interior of the support frame 10 into two empty compartments 8a and 8b. These thus axially flank the cell 2 in front of the cell 2 and are delimited radially by the respective rings 10a and 10b. When viewed axially, these rings 10a and 10b are thus on the outside, for which reason mention will also be made in the following of outer rings 10a and 10b.

The compartments 8a and 8b are connected via respective passages 42a and 42b through the respective outer rings 10a and 10b to the pressurizable chamber 5 of the housing 3 that encloses the support frame 10. The first passage 42a thus opens with its outer end 6a into the upper compartment 8a, and the second passage 42b opens with its outer end 16b into the lower compartment 8b. On the left, FIG. 4 shows a section through the outer upper ring 10a and through the first passage 42a. Furthermore, the outer end 46 of the second passage 42b can be seen in perspective in FIG. 5.

Because of the passages 42a and 42b, the pressure p1 is the same in the interior 5 of the housing 3 and in the compartments 8a and 8b during operation of the converter 1. The cell pressure p2 in the interior 9 of the cell 2 is below the pressure p1 in the housing 3, for example by about 5 bar, so that the cell 2 is pressed axially flat. A gaseous or liquid medium that is appropriately pressurized can be in the pressurizable chamber 5, so that pneumatic (if gas) or hydraulic (if liquid) compression of the cell 2 is achieved. The medium enters the compartments 8a and 8b through the passages 42a and 42b.

Due to the compression of the cell 2 and the resulting axial mobility, electrical contact is made by springs 30 in the form of U-shaped bow springs that bear axially on the cell 2 on the one hand and on respective electrical contacts 6 and 7 on the other hand. The electrical contacts 6 and 7 extend out through the base plate 4 from the interior 5 of the housing. An upper face 6 of the base plate 4 is turned away from the electrical connection to the anode (+) of the cell 2, and a lower face 7 of the base plate 4 is turned toward the electrical connection to the cathode (−) of the cell 2.

A supply structure with chamber 5 22, 23, 36, 37, 13, 33 through which the process media can be conducted to the cell or discharge therefrom extends through the support frame 10. This is indicated by the arrows A and B in FIGS. 1 and 2. The supply structure will be explained in greater detail with reference to the other figures.

Figure 2:
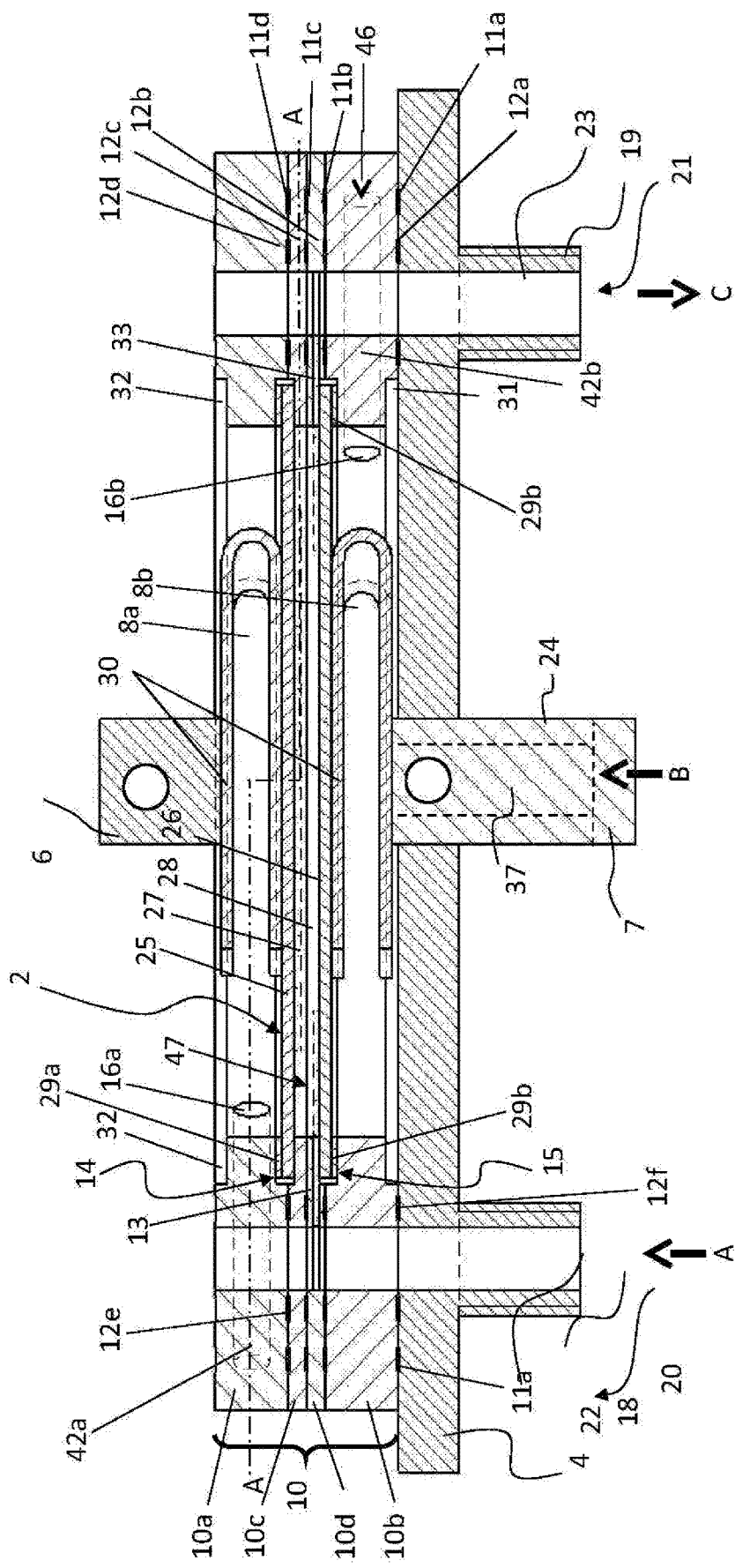
FIG. 2 shows a converter as in FIG. 1 without a housing.

FIG. 2 shows an enlarged view of the support frame 10 mounted on the base plate 4 together with the cell 2. For the sake of clarity, the housing 3 is not shown here.

The cell 2 consists of two electrodes 25, 27; 26, 28 and an ion-conducting membrane 47 that is disposed between them, with each of the electrodes 25, 27; 26, 28 when viewed axially from the inside to the outside having a catalyst layer that abuts one side of the membrane 47, a porous, electrically conductive power distributor 27, 28, and a metallic plate made of copper for the electrical contact. The metal plates 25, 26 thus form the outer walls of the cell 2 and seal the interior 9 of the cell 2 against the container pressure p1. Compared to the conventional design, the metal plates 25, 26 are flat. They can also have a flow field, however. The metal plates 25, 26 can be made very thin, particularly as films, since they do not have to contribute to the mechanical stability or rigidity of the cell 2. A thickness of 1 mm is preferred, but films up to 0.5 mm or plates of up to 3 mm are also possible depending on the design. The porous structure can also have a thickness of about 1 mm. Suitably, the insides of the metal plates 25, 26 have anticorrosive protection. The membrane 47 can be between 15 μm and 200 μm thick.

Two additional rings 10c, 10d, which are referred to below as intermediate rings, are between the two outer rings 10a and 10b. Outer seal rings 11a, 11b, 11c, 11d in the form of flat seals seal the rings 10a, 10b, 10c, 10d against each other near the outer periphery and the lowermost ring 10b against the plate 4. For the flat gaskets 11a, 11b, 11c, 11d, annular grooves 41 are formed in the rings 10a, 10b, 10c, 10d that fit tightly with them. Such an annular groove 41 for an outer seal ring 11c between the two intermediate rings 10c, 10d can be seen from FIG. 4 that shows a plan view of the lower intermediate ring 10d.

On both axial end faces in the inner edge region, each of the rings 10a, 10b, 10c, 10d has an annular recess 14, 15 in which the outer edge region of the cell 2 is received, here specifically the metal plates 25, 26. Elastic elements in the form of flat gaskets 29 are also in the annular recesses 14, 15. They are respectively disposed between the metal plates 25, 26 and the outer rings 10a and 10b in order to allow some flexibility or mobility of the metal plates 25, 26 relative to the outer rings 10a and 10b during hydraulic or pneumatic compression of the cell 2. Damage to the metal plate 25, 26 in the area where they are held on the rings 10a, 10b, 10c, 10d is thus prevented. It is also ensured in this way that the cell 2 does not warp.

Due to the fact that the rings 10a, 10b, 10c, 10d each have an annular recess 14, 15 on both axial end faces in the inner edge region, their end faces are symmetrical, enabling them to engage around the outer surface of a cell 2 at both end faces. This becomes clear from FIG. 6, whose embodiment comprises two cells 2 and 2'. Due to the symmetry, the orientation of the rings 10a, 10b, 10c, 10d is inconsequential. However, this results in the axial ends of the support frame 10 having annular grooves 31, 32 that are then unused.

Figure 3:
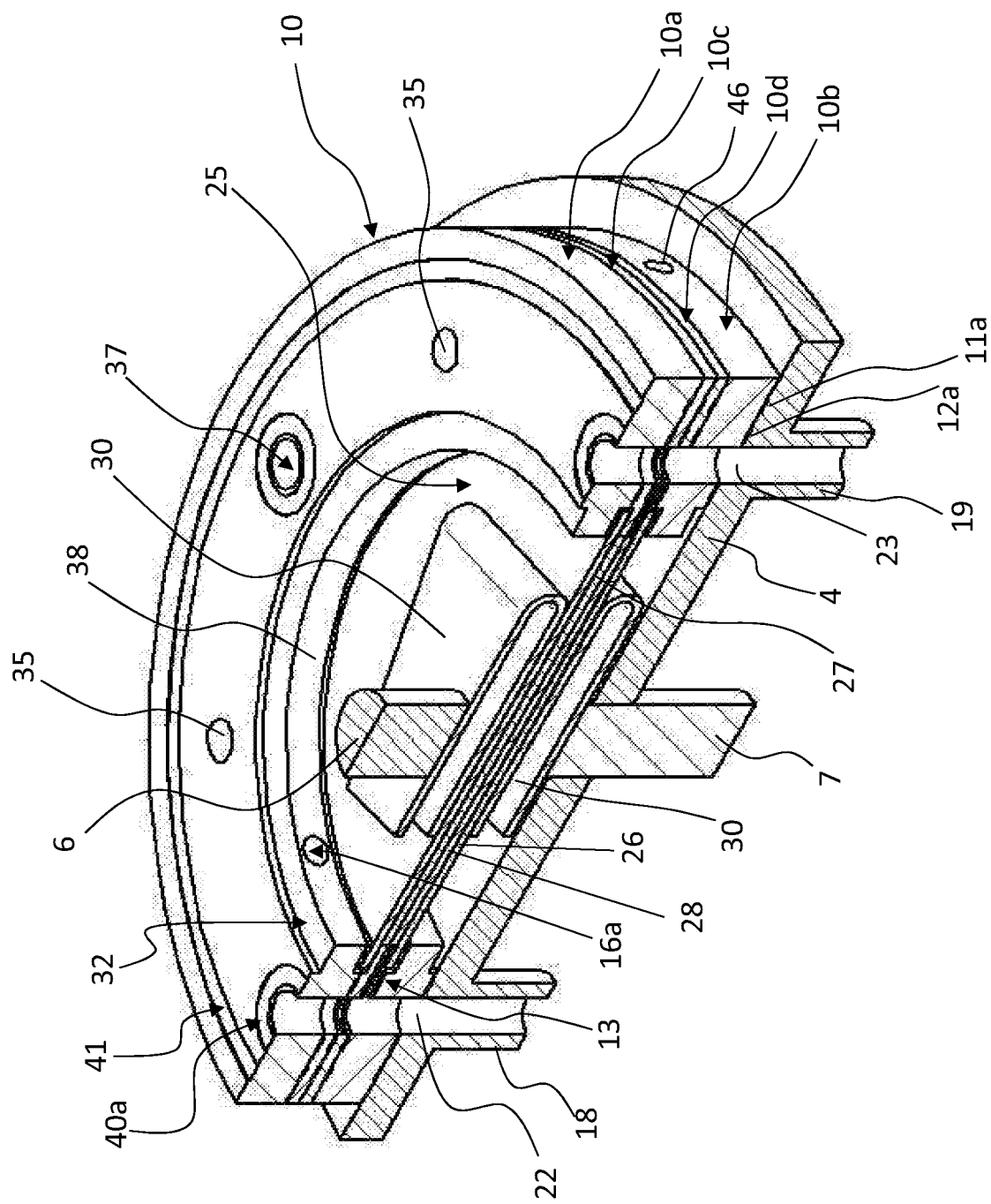
FIG. 3 is a perspective view of the converter as in FIG.

The supply structure comprises primary chamber 5 22, 23, 36, 37 that extend axially through the support frame 10 as well as secondary chamber 5 13, 33, 13b, 33b that extend radially through the support frame 10 and laterally to the cell 2. In the embodiments that are shown in FIGS. 1 to 6, four primary chamber 5 22, 23, 36, 37 are distributed equiangularly over the periphery of the support frame 10. The perspective view in FIG. 3 shows three of these primary chamber 5 22, 23, 37. A fourth primary passage 36 (not shown) is situated diametrically opposite the primary with reference numeral 37. It can be seen in FIGS. 4 and 5, however. The primary chamber 5 22, 23, 36, 37 are formed by holes introduced into the rings 10a, 10b, 10c, 10d, and the rings 10a, 10b, 10c, 10d are aligned in their angular position relative to one another such that the holes are aligned. In like manner, four holes are present in the base plate that correspond in terms of their position with the holes in the rings 10a, 10b, 10c, 10d. Accordingly, the support frame 10 is positioned on the base plate 4 such that the holes in the base plate 4 are aligned with the holes in the rings 10a, 10b, 10c, 10d.

Inner seal rings 12a-12f are arranged around the openings of the holes on both faces of the rings 10a, 10b, 10c, 10d in order to seal the supply structure and the interior 9 of the cell 2 against the pressurizable chamber 5. The inner seal rings 12a-12f are embodied as flat seals and seated in annular grooves 40a and 40b that are concentric with the holes (see FIG. 4).

A connector 18, 19, 24 to which a hose can be connected, for example, is respectively provided around the holes in the base plate 4 on the side of the base plate 4 facing away from the container interior 5. Each of the connectors 18, 19, 24 has an inlet opening 20 or outlet opening 21 through which a process medium can flow into or out of the corresponding primary passage 22, 23, 36, 37.

The secondary chamber 5 13, 33, 13b, 33b are embodied as surface structures in the inner ring-shaped region 34 within the intermediate rings 10c, 10d and thus extend on a radial plane transverse to the axis of the cell 2 through the support frame 10. They connect the cell 2 to a respective one of the primary chamber 5 22, 23, 36, 37. FIG. 2 shows a cutaway individual passage 13 from among the secondary chamber 5 13, 33 that creates a fluid connection between a first of the primary chamber 5 22 and the cell 2. An additional cutaway individual passage 33 from among the secondary chamber 5 13, 33 can also be seen that creates a diametrically opposing fluid connection between the cell 2 and a second one of the primary chamber 5 23. The two individual chamber 5 13, 33 are introduced in the form of grooves into the end face of the lower intermediate ring 10d that is directed toward the lower outer ring 10b. They are part of two opposing passage structures 39a and 39b composed of a plurality of individual chamber 5 that extend like a comb or fan from the first and second primary chamber 5 22, 23, respectively, to the cell 2 or vice versa, depending on the direction of flow. The cell 2 is thus arranged between these two passage structures 39a and 39b. This is illustrated in FIGS. 4 and 5. FIG. 4 shows a top view of the lower intermediate ring 10d. The passage structures 39a and 39b and their secondary chamber 5 13, 33 are present on the non-visible underside and are therefore indicated only by broken lines.

Likewise, such passage structures 39c, 39d are present in the other, the upper intermediate ring 10c, i.e., on a different radial plane. They are also introduced in the form of grooves into the end face of the upper intermediate ring 10c that faces toward the outer upper ring 10a and connect the third primary passage 37 and the fourth primary passage 36 with the cell via respective individual chamber 5 13b, 33b that are arranged like fans or combs or, conversely, with the corresponding primary passage 36, 37, depending on the direction of flow. The support frame 10 thus comprises two sets of secondary chamber 5, with a first group being present in the lower intermediate ring 10d and a second group in the upper intermediate ring 10c. However, the two groups are rotated by 90° relative to one another. This becomes clear from FIG. 5.

FIG. 5 shows a section along the section line A-A that is shown in FIG. 2 that jumps to another radial plane in the center of the arrangement. On the left side of FIG. 5, it runs through the passage 42a in the upper outer ring 10a, then jumps in the center of the arrangement onto a lower radial plane that extends in the right half of the image through the upper intermediate ring 10c and the anode-side power distributor 27. In this sectional representation, the passage structures 39c, 39d and their secondary chamber 5 13b, 33b are open upward.

While the first group of secondary chamber 5 13, 33 extends here from left to right in the lower intermediate ring 10d in the illustration of FIGS. 4 and 5, the second group of secondary chamber 5 13b, 33b extends from back to front in the upper intermediate ring 10c in FIG. 5.

During operation of the converter 1 as a fuel cell, air, particularly oxygen ($O_2$), is conveyed through the inlet opening 20 at the connector 18 (arrow A to the left) via the first primary passage 22 and the adjoining individual chamber 5 13 of the first passage structure 39a to the cathode side of the cell 2. The air or oxygen flows through the porous layer 28 and, insofar as it is not consumed, passes on the opposite side into the individual chamber 5 33 of the second passage structure 39b that bundles them into the second primary passage 23 and discharges them via this second primary passage 23. It then passes out of the converter 1 through the discharge opening 21 at the connector 19 (arrow A to the right). The air or the oxygen is conducted through this part of the supply structure, for example in a loop.

Figure 1:
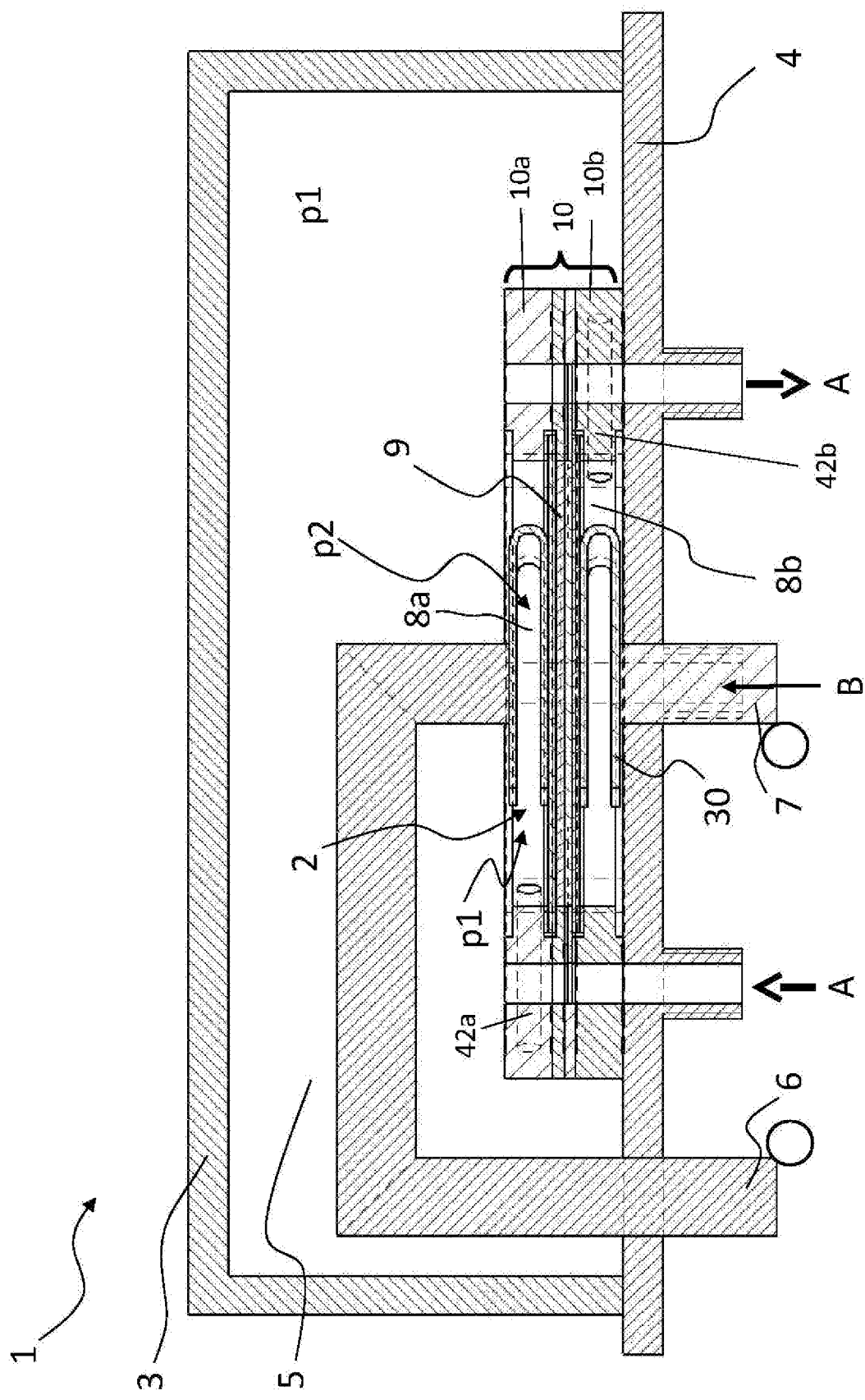
FIG. 1 is an axial section through a converter according to the invention with a cell along section line CC in FIG. 4.

In addition, during operation of the converter 1 as a fuel cell, hydrogen ($H_2$) is conducted through an inlet opening of a nozzle 24 (arrow B) that is concealed in FIGS. 1, 2 and 3 via the third primary passage 37 and via the adjoining individual chamber 5 of the first passage structure of the second group of secondary chamber 5 to the anode side of the cell 2. The hydrogen flows through the porous layer 27 and, insofar as it is not consumed, passes on the opposite side into the individual chamber 5 of the second passage structure that bundles them into the fourth primary passage 36 and discharges them via this fourth primary passage 36. The hydrogen then exits the converter 1 through a corresponding discharge opening at an additional connector. The hydrogen is conducted through this part of the supply structure, for example in a loop.

During operation of the converter as a fuel cell, a portion of the hydrogen is ionized, with the hydrogen ions migrating through the membrane 47 and combining with the oxygen to form water that is then conducted from the cell 2 together with the oxygen.

During operation of the converter 1 as an electrolyzer, water is supplied via the first primary passage 22 to the cell 2 in order to maintain pressure in the cell 2. Water is also supplied via the third primary passage 37, the water being electrolytically decomposed into hydrogen and oxygen. Hydrogen ions that are formed migrate through the membrane 47 and recombine to form hydrogen that is discharge with the water from the first primary passage 22 via the second primary passage 23. Oxygen that is formed is conducted out of the converter via the fourth primary passage 36 with the water supplied via the third primary passage 37.

FIG. 6 shows a embodiment of the converter 1 with two cells 2 and 2' with an additional cell 2' being stacked here on the cell 2 shown in FIGS. 1 to 5. Any number of cells can be stacked on top of one another in an analogous manner.

Four rings 10a, 10b, 10c, 10d and 10a', 10a', 10c', 10d' are associated here with each cell 2 and 2', two rings 10a and 10b, 10a and 10a being arranged axially on the outside (relative to the respective cell), and two rings 10c, 10d and 10c, 10d between them. However, the upper outer ring 10a of the lower cell 2 simultaneously holds the upper cell 2, so that this ring 10a simultaneously forms the lower outer ring of the upper cell 2. The two cells 2 and 2' thus share this ring 10a, so it is associated with both cells 2 and 2'. This is possible due to the symmetry of the outer rings 10a, 10b, 10a', i.e., by virtue of the recess 14, 14', 15 that is present on both end faces on their inner periphery.

The second, upper cell 2' is held on the support frame 10 in identical fashion to the first, lower cell 2.

The electrical contacting occurs in the same manner as in the first embodiment by springs in the form of three bow springs 30 that are situated in the compartments 8a, 8b, 8c. A bow spring 30 is resiliently arranged between the first and second cells 2, 2 in the center compartment 8b and thus electrically interconnects the two cells 2 and 2'. A respective additional bow spring 30 is arranged on the other side of the cells 2 and 2' in the lowermost and uppermost compartment 8a and 8c that connects the respective cell 2 and 2' with one of the electrical contacts 6, 7 at the corresponding axial end of the support frame 10. The two cells 2 and 2' are connected in series in this way.

An end plate 17, also a for example a ring, that rests on the uppermost ring 10a' of the support frame 10 and serves to exert a uniform pressure on the stack of rings, is provided on the axial end of the support frame 10 that is opposite the base plate 4. Such an end plate 7 can also be provided in the embodiment as in FIG. 1.

Four tie rods equidistantly distributed over the circumference in the form of screws 43, 45 extend with their respective shaft 45 through corresponding guide holes 35 through the support frame 10. FIGS. 3 and 4 show these guide holes, the number not being limited to four. Rather, there could be more or only three. Corresponding holes are also present in the upper end plate 7 and the base plate 4. Nuts 44 are screwed from the underside of the base plate 4 facing away from the interior 5 of the housing 3 onto the shaft 45 of the screws and tightened so that the support frame is clamped axially mechanically between the end plate 17 and the base plate. The outer edge region of the cells 2, is thereby pressed between the outer rings and sealed due to the seal 29.

As is clear from FIGS. 1 to 6, the converter 1 substantially comprises an element that supports the cell 2 and 2', namely the support frame 10 that can be made of insulating plastic and performs a number of functions of the conventional pole plates that are known from the field of fuel cells and electrolyzers. These are the supplying of the cell or cells 2 and 2' with process media (gas and/or water), the sealing of the cells 2 and 2' in the outer edge region opposite the pressurizable chamber and of the cells 2 and 2' relative to one another by O-rings and/or flat rings 11a-11e, 12a-12f, the accommodation of the power distributor 27, 28, the flexible plates or contact films 25, 26, and the provision of mechanical stability for application of a prestress to the support frame 10.

The required flexibility of the plates or contact film 25, 26 in the rear region of each half of the cell is ensured such that the plate or film 25, 26 receives an elastic element 29a and 29b in the edge region that absorb the movements that occur as a result of the application of a hydraulic pressure. The elastic element 29a and 29b can be instantiated by an annular flat gasket that may be laminated on the outer edge of the film, for example. Deformation of the cell 2 and 2' can thus be prevented.

The plate or film 25, 26 can be made to be very thin, since it need only tightly separate the inner region of the cell 2, from the surrounding pressure medium and does not contribute to the mechanical stability of the overall stack. This reduces the cost of materials and the associated electrical losses substantially in comparison to conventional pole plates that are each usually 2-3 mm thick.

The contacting of the cells 2 and 2' with one other takes place in the region of the active surface in the free compartment 8a and 8b via flexible electrical conductors, for example in the form of biased copper springs 20. Alternatively, it is also possible to provide the plates or films 25, 26 with tabs in such a way that the cells 2 and 2' in the surrounding compartment 8a and 8b, 8c can be interconnected. This eliminates the two tabs that were required on the power distributor 27, 28 in previous hydraulic stack concepts and made necessary an electrical connection of the cells 2 and 2' outside the pocket construction according to the prior art. The electrical losses and the use of materials are thus further reduced.

The pressures of the system are adjusted according to the known concept of the pressure tracking of the hydraulic pressure with the process media pressures. As an alternative to a liquid, the pressurizable chamber 5 can also be charged with a gas so that the cells are compressed pneumatically. This ensures that a corresponding hydraulic/pneumatic pressure p1 is present across the cells 2 and 2' that is dependent on the existing internal pressure (gas pressure) p2. The difference of by is calculated solely based on the contact pressure that is required for the respective material combination (power distributor and catalyst-coated membrane).

After introduction of the individual cell elements (plates, contact film, power distributor, catalyst-coated membrane, seals, etc.), each cell 2 and 2' can be pre-assembled separately and optionally glued or welded to the support frame 10. This means that an almost arbitrary stack size is possible in terms of the number of cells, and subsequent replacement of individual cells is easy to perform in case of defects.

The shapes are preferably round in order to allow for a simple topology for the individual sealing elements 11a to 11e, 12a to 12f and the surrounding pressurizable container 3 as well. In summary, it should be noted that the positive features of both concepts can be utilized by appropriately combining the two stack concepts (i.e., that of hydraulic or pneumatic compression and the stacking of individual cells). Particularly noteworthy in this regard are the homogeneous current density and the possibility of temperature control (in the case of hydraulic compression). Reference is also made here to the excellent electrical contacting in the surface of the electrochemically active region of the individual cells (conventional construction). It is possible to use thinner and more electrically favorable materials by substantially reducing the pile plate thickness, for example. Additional cooling cells are eliminated, since the hydraulic medium itself can be used as a coolant. The electrical contacting of the cells with one another reduces the contact resistance that occurs between the cells, thus enhancing the efficiency of the overall system. Through the expression of a trackable pressure gradient between cells and surrounding hydraulic medium, practically any operating pressures can be achieved in the cells.

The invention claimed is:

1. A converter for converting chemical energy into electrical energy or electrical energy into chemical energy, the converter comprising:
   an electrochemically active, planar cell centered on an axis;
   a pair of electrolytically insulating coaxial rings radially surrounding the cell and through which extends a supply structure with channels for conducting process media to the cell, the rings forming compartments axially flanking the cell and each delimited radially by a respective one of the rings;
   a pressurizable chamber surrounding the rings, each ring being formed with a respective radially extending passage lying on a central radial plane transverse to the axis and extending directly between the respective compartment and the chamber for communication of fluid directly between the respective compartment and the pressurizable chamber; and
   a pressurized medium filling the pressurizable chamber during operation of the converter for axially compressing the cell.

2. The converter according to claim 1, wherein the channels of the supply structure include primary channels that extend axially to the cell through the rings.

3. The converter according to claim 2, wherein the channels of the supply structure include secondary channels that extend on a radial plane transverse to the axis of the cell through the rings, the secondary channels connecting the cell to the primary channels.

4. The converter according to claim 3, wherein the secondary channels are formed by two opposing comb-like or fan-like channel structures with a plurality of individual subchannels, with the cell being disposed between these two channel structures.

5. The converter according to claim 1, wherein the cell is held with its outer edge region on an inner edge region of the rings between the rings.

6. The converter according to claim 5, further comprising:
   molded annular flat gaskets between the outer edge region of the cell and the opposite inner edge region of the rings.

7. The converter according to claim 5, wherein the rings each have an annular recess on one or both axial end faces in the respective inner edge region in order to receive the outer edge region of the cell.

8. The converter according to claim 1, wherein the rings are symmetrical relative to a central radial plane including the axis.

9. The converter according to claim 1, wherein each of the ring has two of the passages to the pressurizable chamber.

10. The converter according to claim 1, wherein the passages are of circularly arcuate section.

11. The converter according to claim 1, wherein the medium is a liquid.

12. The converter according to claim 1, further comprising:
    springs electrically contacting the cell.

13. The converter according to claim 12, wherein each of the springs electrically contacts an adjacent cell or an electrical terminal at an axial end of a support frame formed by the rings.

14. The converter according to claim 13, wherein the support frame has a circular cross section.

15. The converter according to claim 13, wherein the pressurizable chamber is formed by a housing having an interior that encloses the support frame.

16. The converter according to claim 1, wherein the cell forms a cell segment of a cell module of two or more cell segments.

17. The converter according to claim 1, wherein there are a plurality of the electrochemically active, planar cells, each of which is held securely between a respective pair of the coaxial rings forming a support frame, with all of the rings being stacked concentrically on one another.

18. The converter according to claim 1, wherein the rings are axially compressed mechanically by tie rods that extend axially parallel through the rings in order to seal the cell and the supply structure.

19. The converter according to claim 1, wherein the cell consists of two electrodes and an ion-conducting membrane between them, with the electrodes each being composed of a catalyst layer that abuts one side of the membrane, a porous, electrically conductive power distributor, and an electrically conductive plate or film for electrical contacting, with the plates or the films sealing the interior of the cell against the pressure in the pressurizable chamber.

20. The converter according to claim 1, wherein the converter is a fuel cell, an electrolyzer, or a battery.

* * * * *